United States Patent [19]

Iwawaki et al.

[11] 4,149,839
[45] Apr. 17, 1979

[54] BLOW MOLDING APPARATUS

[75] Inventors: Akira Iwawaki, Yokohama; Kinshiro Kojima, Kawasaki; Hisahiko Fukase, Tokyo; Yoshiharu Shitara; Akihiro Nomura, both of Yokohama; Takehiko Sato, Zushi; Hideo Shibata, Yokohama, all of Japan

[73] Assignee: Ishikawajima-Harima Jukogyo Kabushiki Kaisha, Tokyo, Japan

[21] Appl. No.: 776,760

[22] Filed: Mar. 11, 1977

Related U.S. Application Data

[62] Division of Ser. No. 645,464, Dec. 30, 1975, abandoned.

[51] Int. Cl.² ............................ B29F 3/00; B29F 3/12
[52] U.S. Cl. .................................. 425/133.1; 425/532
[58] Field of Search .................... 425/133.1, 466, 467, 425/532; 264/173

[56] References Cited

U.S. PATENT DOCUMENTS

| 3,901,958 | 8/1975 | Doll | 425/532 X |
| 3,950,118 | 4/1976 | Adair | 425/144 |
| 3,985,490 | 10/1976 | Kader | 425/466 X |

Primary Examiner—Richard B. Lazarus
Attorney, Agent, or Firm—Scrivener, Parker, Scrivener & Clarke

[57] ABSTRACT

A blow molding method and machine and more particularly a method and machine for extruding a multi-layer parison for blow molding, wherein at least two layers of molding plastics, each plastic compensating the poor or undesirable physical and chemical properties of the other plastic and/or each having a different color are forced to flow through different passages having an annular cross sectional configuration, and are joined at the junction of a short passage to be extruded into a multi-layer parison.

2 Claims, 16 Drawing Figures

BLOW MOLDING APPARATUS

This is a division of application Ser. No. 645,464 filed Dec. 30, 1975 and now abandoned.

DETAILED DESCRIPTION OF THE INVENTION

It has been well known in the art that the properties and characteristics of thermoplastic resin hollow containers molded by the blow molding method may be improved when molded so as to have multi-well shell. For instance, polyolefin plastics are used for the production of hollow containers because these plastics give the desired properties of the containers. Therefore the polyolefin plastic containers find a variety of applications in various fields. However, the properties of such containers cannot satisfy every demand of the users. For instance, they exhibit poor resistance to chemical compounds such as organic solvents, oils and fats which permeates a wall and occurs. Furthermore they exhibit poor oxygen or gas tightness. As a result, their usage is limited to some extent.

It has been well known in the art that the desired properties such as mechanical strength, gas tightness and so on of the polyolefin plastic containers could be satisfactorily improved if they could be so molded as to have a multi-layer shell including a nylon layer. However, multi-layer containers have not been produced by blow molding because of the technical difficulties to be described below. First of all, it is extremely difficult to form a layer of a uniform thickness in the step when a plurality of layers are laminated. A considerably long time and considerable materials are required for controlling the layer formation so as to form the layers of a uniform thickness. Another difficulty is that the molding speed is very low so that an efficient molding operation cannot be attained.

These and other technical difficulties involved will be described in more detail with reference to FIG. 1. In the molding machine shown in FIG. 1, accumulators c and d are placed between extruders a and b and a molding head so that a parison may be intermittently formed and charged into molding dies. In general, the parison molding head is of the cross head type regardless of the fact whether molding plastics are directly forced into the molding head or they are stored in the accumulators and then intermittently forced into the molding head. Therefore, it is very difficult to flow the molding plastic at a uniform flow rate and under the uniform extrusion pressure in a molding plastic passage between the point h at which molding plastic contacts with a mandrel g and the point i. In addition, the flow rate is further influenced by other complex factors such as the melting condition inherent to the plastic used, memory, variation in swelling ratio and so on. As a result, the parison f has the wall- or layer-thickness variation and bendings. Such layer-thickness variation and bendings may be corrected by adjusting space between the mandrel j and a nozzle e of the molding head. But such correction method is effective only in case of the molding of a single-layer parison, and is virtually not effective in case of the molding of a multi-layer parison. Thus, it is extremely difficult to form a layer of a uniform thickness in case of the molding of a multi-layer parison. A complex mechanism is required for overcoming this problem. For instance, in addition to the control of the spacing between the nozzle e and the mandrel j, there may be suggested to provide a device for varying the cross sectional areas of the molding plastic passages so that the flow rates of the molding plastics forming the outer and inner layers of the multi-layer parison may be suitably controlled at the upper stream of the junction or point where the molding plastics are joined or laminated. Even if such arrangement is possible, the molding speed would be very slow. Furthermore, the layer-thickness variation occurs in the step of draw-down. Thus, the above countermeasures are inefficient and still unsatisfactory so that articles with desired qualities cannot be molded.

One of the objects of the present invention is, therefore, to provide a method and device for blow molding thermoplastic resin, multi-layer hollow containers in which each layer has a uniform thickness through the layer.

Another object of the present invention is to provide a method and device for blow molding thermoplastic resin, multi-layer hollow articles in which the section thickness ratio between the layers may be suitably varied and in which each layer may have a different color so that various color effects may be produced.

A further object of the present invention is to provide a method and device for blow molding thermoplastic resin, multi-layer hollow articles in which an expensive plastic may be economically used only at a portion in which it is required.

A further object of the present invention is to provide a method and device for blow molding thermoplastic resin, multi-layer hollow articles which method and device may prevent the mixture of different plastics so that the burrs may not contain other plastics and may be recycled in the production with the consequent result of reduction in cost.

A further object of the present invention is to provide a method and device for blow molding thermoplastic resin, multi-layer hollow articles which method and device may concurrently control not only the ratio of section thickness of the layers but also the overall section thickness of the layer or shell of the molded article.

The present invention will become more apparent from the following description of some preferred embodiments of the present invention taken in conjunction with the accompanying drawing, in which.

Figure 1:
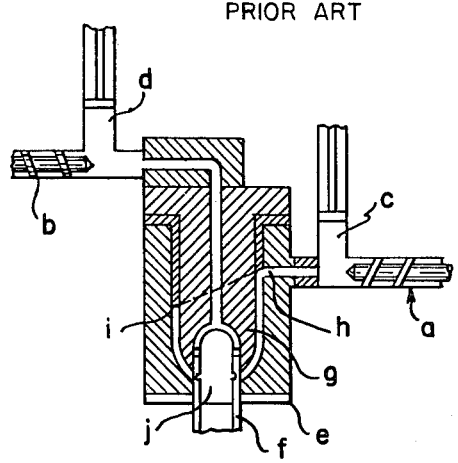
FIG. 1 is a sectional view of a prior art molding machine for blow molding multi-layer articles.
Figure 2:
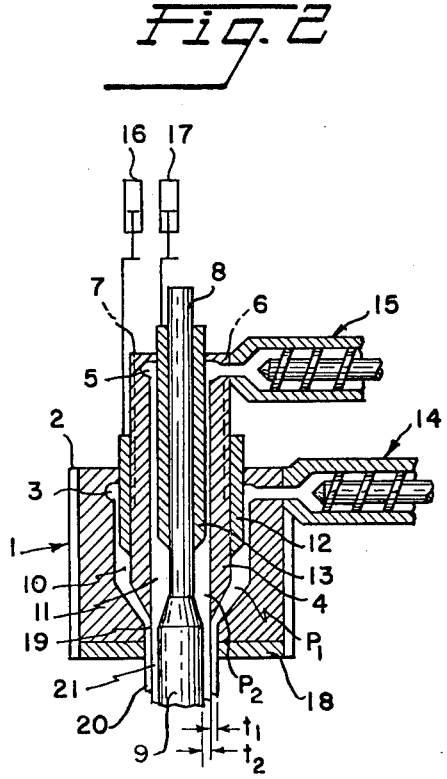
FIG. 2 is a fragmentary sectional view of a first embodiment of a blow molding machine in accordance with the present invention.

In FIG. 2 there is shown the first embodiment of the present invention for extruding a two-layer parison for blow molding. An extrusion head 1 includes a heater 2, an annular molding plastic passage 3, and a partition cylinder 4 with an annular molding plastic passage 5, .A heater 6 and cooling holes 7 is disposed within the molding head 1 coaxially thereof and spaced apart therefrom by a suitable distance so that a molding plastic reservoir 10 may be defined therebetween. A supporting rod 8 having its lower end terminating in a mandrel 9 is disposed within the partition cylinder 4 coaxially thereof and spaced apart therefrom by a suitable distance so that another molding plastic reservoir 11 may be defined therebetween. A first ring piston 12 drivingly coupled to a first hydrualic cylinder 16 is slidably reciprocable between the molding head 1 and the partition cylinder 4 while a second speed-variable ring piston 13 drivingly coupled to a second hydraulic cylinder 17 is slidably reciprocable between the partition cylinder 4 and the supporting rod 8. The molding plastics are forced by extruders 14 and 15 to flow through the annular passages 3 and 5 into the reservoirs 10 and 11, respectively, and the molding plastics in the reservoirs 10 and 11 are extruded by the first and second ring pistons 12 and 13 into a two-layer parison. That is, the layer of molding plastic forced out of the reservoir 10 by the downward stroke of the first ring piston 12 immediately joins at the junction 19 with the layer of molding plastic forced out of the reservoir 11 by the downward stroke of the second ring piston 13, and the joined or laminated molding plastic layers 20 and 21 are extruded through the clearance between the mandrel 9 and a nozzle 18 into a two-layer parison.

Next the mode of operation of the first embodiment with the above construction will be described. First depending upon the molding temperatures of the molding plastics to be used, the temperature of the partition cylinder 4 is suitably adjusted by the temperature control system consisting of the heater 6 and the cooling holes 7 while the temperature of the molding head 1 is controlled by the heater 2. The plasticized molding compounds are extruded by the extruders 14 and 15 and forced through the annular passages 3 and 5 into the molding plastic reservoirs 10 and 11 so that the ring pistons 12 and 13 are forced upwardly. Alternatively, the hydraulic cylinders 16 and 17 may be driven so as to lift the ring pistons 12 and 13, respectively, over suitable distances in response to the quantities of the molding compounds forced out of the extruders 14 and 15 in order to prevent the leakage of the molding plastics through the clearance between the nozzle hole 18 and the mandrel 9. Thereafter the hydraulic cylinders 16 and 17 are driven so as to force the ring pistons 12 and 13 downward at suitable speeds, thereby exerting the downward pressures to the molding plastics in the reservoirs 10 and 11 so that the molding plastics are joined at the junction or joining or laminating point 19 and extruded through the clearance between the mandrel 9 and the nozzle 18 into a parison consisting of the layers 20 and 21. In the first embodiment, the ring pistons 12 and 13 are driven independently of each other. That is, the downstroke starting time as well as the downstroke speed may be varied independently so that parison having one-layer wall or two-layer wall may be selectively extruded.

According to the present invention, the ring pistons 12 and 13 may exert a uniform extruding pressure and speed to the molding plastics in the reservoirs 10 and 11 so that the molding plastics may be joined at the joining or laminating point 19 at the same and uniform speed. Therefore, unlike the prior art cross head type molding machine, the problems of the deviation in wall thickness and bendings may be completely overcome. Furthermore, the extrusion speeds of the ring pistons 12 and 13 may be changed independently of each other as descried above so that the molding plastics in the reservoirs 10 and 11 may be extruded at different flow rates. Therefore, the wall section thickness ratio between the layers 20 and 21 may be arbitrarily varied over the range of 0 to 100%.

Figure 3:
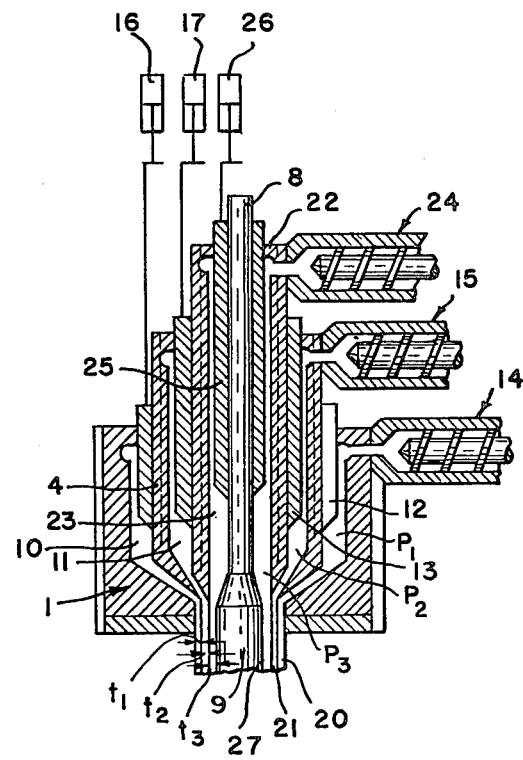
FIG. 3 is a sectional view of a second embodiment of the present invention for molding three-layer articles.

The second embodiment shown in FIG. 3 is adapted to extrude a three-layer parison, and is substantially similar in construction to the first embodiment except that a second partition cylinder 22 is interposed between the first partition cylinder 4 and the mandrel supporting rod 8 so that a third molding plastic reservoir 23 may be defined between the partition cylinder 22 and the supporting rod 8. A third extruder 24 is provided to force a third molding plastic into the third reservoir 23 while a third ring piston 25 drivingly coupled to a hydraulic cylinder 26 is slidably interposed between the supporting rod 8 and the third partition cylinder 22 for forcing the third molding plastic in the reservoir 23 to flow down toward the mandrel 9.

The mode of operation of the second embodiment with the above construction is also substantially similar to that of the first embodiment except that it may extrude a three-layer parison. That is, as with the first embodiment when the first, second and third ring pistons 12, 13 and 25 are simultaneously lowered at the same speed, the parison may be extruded with the three layers 20, 21 and 27 having the same section thickness. The thickness ratio may be arbitarily varied by suitably charging the extrusion speeds of the ring pistons 12, 13 and 25.

Figure 4:
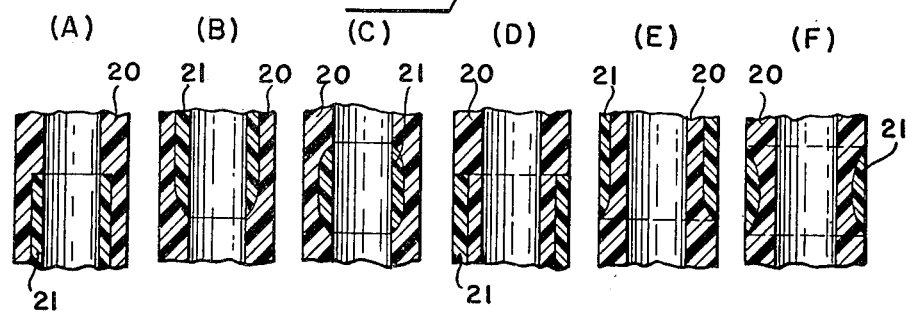
FIGS. 4A through 4F are views used for the explanation of the steps of molding two-layer articles at different molding speeds.
Figure 5:
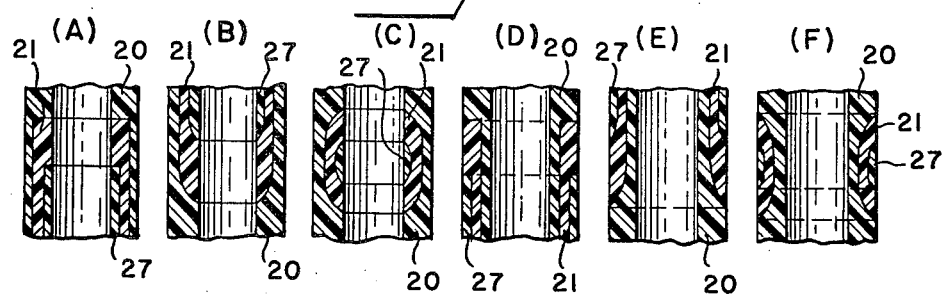
FIGS. 5A through 5F are views used for the explanation of the steps of molding three-layer articles at different molding speeds.

Next referring to FIGS. 4, 5 and 6, the methods for molding various kinds of molded articles with the molding machines shown in FIGS. 2 and 3 will be described in detail. These molding machines may mold the two- or three-layer parison with the layers different in thickness and in color or the parison in which the lamination of the layers is stepped.

Referring back to FIG. 2, the thickness $t_1$ and $t_2$ of the first and second plastic layers 20 and 21 may be varied by changing the extrusion speeds $P_1$ and $P_2$ of the first and second molding plastics. That is, the thickness $t_1$ and $t_2$ may be changed as a function of time. For instance, when the second molding plastic extrusion speed $P_2$ is suddenly changed to zero when both the first and second molding plastics 20 and 21 are being simultaneously extruded at the same speed, the thickness ratio may be changed as shown in FIG. 4(A). In like manner, when the second molding plastic 21 is extruded when only the first molding plastic 20 is being extruded, the thickness ratio may be changed as shown in FIG. 4(B). When the second molding plastic 21 is extruded only for a predetermined time interval when only the first molding plastic is being extruded, the thickness ratio may be locally changed as shown in FIG. 4(C). In like manner, the thickness ratio may be changed as shown in FIGS. 4(D), (E) and (F) by suitably controlling the extrusion speeds and extrusion timing. Therefore, various molded articles with the layers different in thickness may be produced by blow molding the parisons thus obtained.

In like manner, the wall thickness ratio of the three-layer parison extruded by the molding machine shown in FIG. 3 may be varied suitably. That is, the thickness ratio may be arbitarily varied by controlling the first, second and third molding plastic extrusion speeds $P_1$, $P_2$ and $P_3$ over the ratio between 0 and 100% and by controlling the extrusion timing of each molding plastic. Therefore the thickness $t_1$, $t_2$ and $t_3$ of the first, second and third plastic layers 20, 21 and 27 may be changed freely. For instance, when the third and second molding plastic extrusion speeds $P_3$ and $P_2$ are changed to zero in a suitable time interval when all of the first, second and third molding plastics are being extruded, the thickness ratio may be changed as shown in FIG. 5(A). On the other hand, when the second and third molding plastics 27 and 21 are extruded in a suitable time interval when only the first molding plastic 20 is being extruded, the thickness ratio may be changed as shown in FIG. 5(B). When the second and third molding plastics 21 and 27 are extruded only for predetermined time intervals, respectively, when only the first molding plastic 20 is being extruded, the thickness ratio may be locally changed as shown in FIG. 5(C). In like manner, the thickness ration may be changed as shown in FIGS. 5(D), (E) and (F) by controlling the extrusion speeds and extrusion timing. Therefore, various kinds of molded articles with the layers different in thickness may be produced by blow molding the three-layer parisons thus obtained.

In summary, by controlling the extrusion speeds and extrusion timing, the two-layer or three-layer parisons with the two or three layers consisting of plastics of the same or different series or compositions and colors may be produced. Furthermore, the compositions and colors may be locally changed at any portions of the parison being extruded. Therefore, the parison with the stepped layers may be produced, and the colors of the layers may be arbitarily changed and shaded depending upon the required properties and characteristics of the final molded articles.

Figure 6:
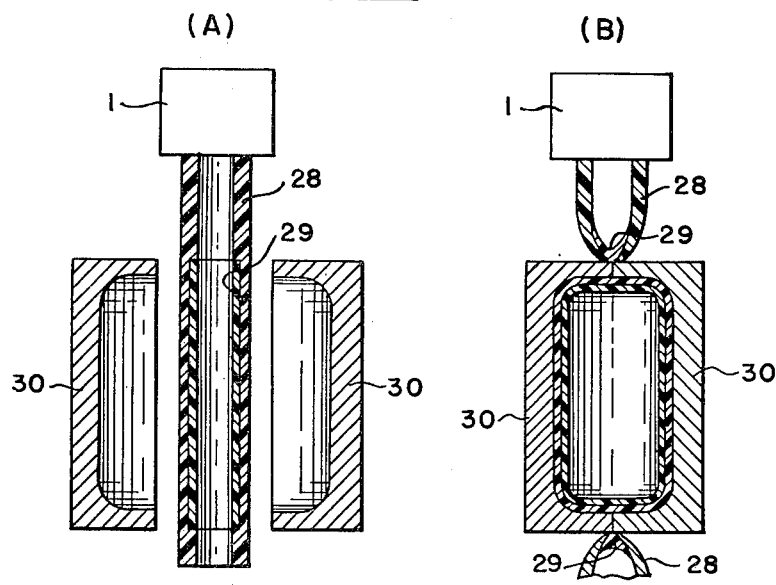
FIG. 6A and 6B are views used for the explanation of one blowing method in accordance with the present invention.
Figure 7:
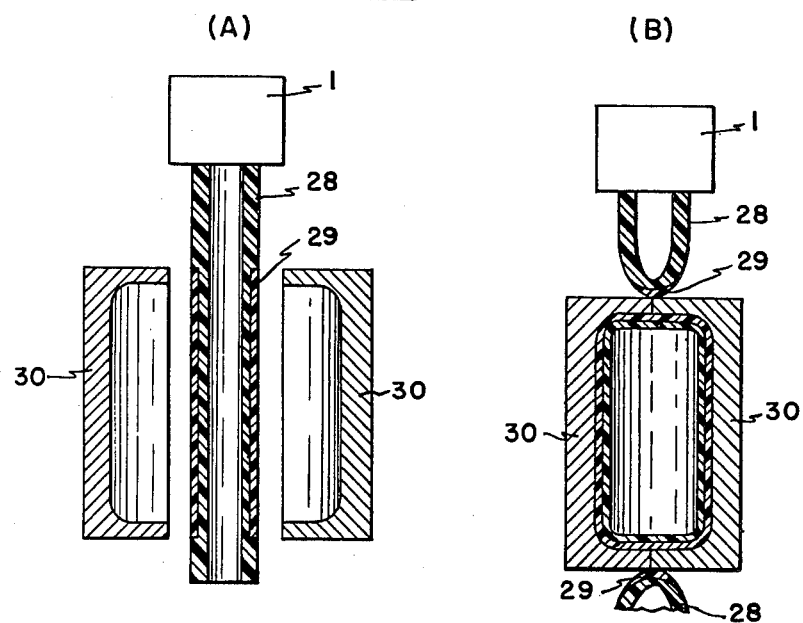
FIGS. 7A and 7B are views used for the explanation of another blow molding method in accordance with the present invention.

In order to blow mold the two- or three-layer parison extruded from the molding machine shown in FIG. 2 or FIG. 3, blow molding dies shown in FIGS. 6 and 7 are placed immediately below the molding head 1. The multi-wall or layer containers with satisfactory physical and chemical properties may be mass-produced at low cost. That is, according to the present invention, the parison in which each layer may compensate the poor and undesired physical and chemical properties of the other layers may be produced. Furthermore, as described above, such compensating layer may be extruded only in the required portion of the parison. That is, such compensating layer may be formed only in the portion of the parison to be injected into the blow molding dies so that the parison which remains outside of the molding dies may not include such compensating layer. Therefore, the parison which has not been subjected to the blow molding consists of a single kind of plastic not including other plastics so that the recycling of the waste parison may be much facilitated. This will be described in detail with reference to FIG. 6. When a second molding plastic 29 is extruded only for a predetermined time interval when a first molding plastic is being extruded, the parison with a local double-layer wall of a predetermined distance may be produced as shown in FIG. 6(A). Only the portion of the parison with such double-layer wall is charged into the molding dies 30 and blown in the conventional manner as shown in FIG. 6(B) so that a container with the two different plastic shells having the same and uniform thickness may be produced. Therefore, the loss of the second plastic 29 may be reduced only to the portion which is clamped by the mating surfaces of the molding dies 30. Thus, the considerably economy of the second plastic 29 may be attained. In like manner, as shown in FIG. 7(A), the second plastic 29 may be so extruded as to form the outer layer of the two-layer parison only in the length corresponding the longitudinal length of the molding dies 30. The double-layer-wall parison is charged into the dies 30 and blow molded to produce a double-layer container as shown in FIG. 7(B). Therefore, the loss of the second plastic 29 may be also minimized. In addition, the parison consisting of the outer layer of a thermosetting plastic and the inner layer of a thermoplastic resin may be extruded and blow molded in the same manner as described above so that the container with the outer shell of the thermosetting plastic and the inner shell of the thermoplastic resin may be molded and that the consumption of the thermosetting plastic may be minimized.

In like manner, the three-layer parison may be extruded by the molding machine shown in FIG. 3 and may be blow molded to produce the articles with three shells or layers. The requirements for the plastics for reinforcing and/or property compensating purposes may be also minimized.

Figure 8:
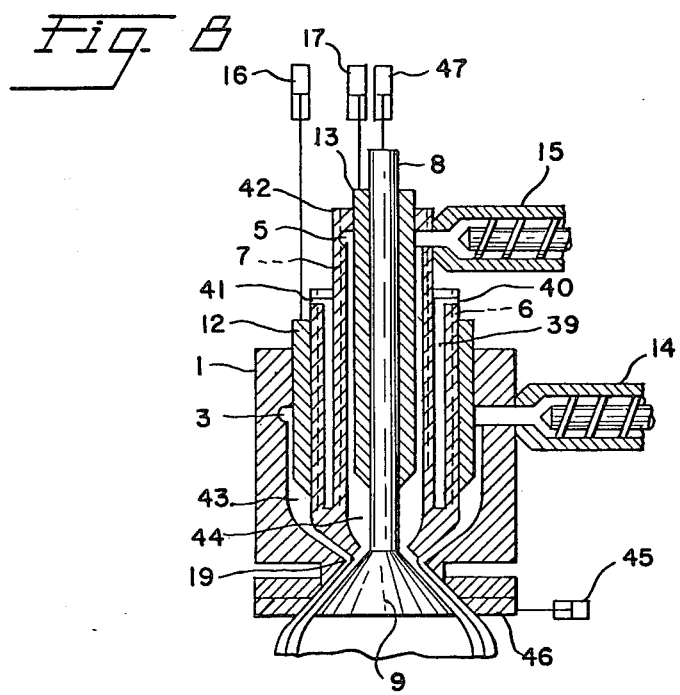
FIG. 8 is a sectional view of a third embodiment of a blow molding machine in accordance with the present invention.

The third embodiment shown in FIG. 8 is a modification of the first embodiment shown in FIG. 2 so that plastics and rubbers whose molding temperatures are widely different from each other and whose blow molding is generally difficult may be extruded into a two-layer parison for blow molding. Within the molding head 1 is coaxially disposed a partition cylinder 42 including the heater 6, the cooling holes 7, the annular molding compound passage 5 and an air chamber 39 with air inlets and outlets 40 and 41. Within the partition cylinder 42 is disposed coaxially slidably the supporting rod 8 of the mandrel 9 drivingly coupled to a hydraulic cylinder 47, and the ring piston 13 is slidably interposed between the supporting rod 8 and the partition cylinder 42. A molding compound reservoir 44 is defined between the supporting rod 8 and the partition cylinder 42 below the ring piston 13. Another molding compound reservoir 43 is defined between the molding head 1 and the cylinder 42 below the ring piston 12 slidably interposed therebetween. In this embodiment, a thermoplastic resin is forced into the reservoir 43 by the extruder 14 while a rubber, into the reservoir 44 by the extruder 15. As with the first embodiment, the molding plastic and rubber in the reservoirs 43 and 44 are extruded by the ring pistons 12 and 13 through the clearance between the mandrel 9 and a nozzle 46 operatively coupled to a hydraulic cylinder 45.

So far it has been considered extremely difficult to blow mold natural, synthetic and thermoplastic rubbers. In the prior art method, a rubber tube or the like is manually inserted into a rubber parison. Therefore, the blow molding operation is very tedious, and the articles are molded only in small quantity. The reason why it is difficult to blow mold a rubber parison is that there is a limit to the expansion of the rubber parison subjected to the blow molding.

However, according to the present invention, the thermoplastic resins may be used so as to compensate the poor blow moldability of the rubbers so that the rubbers may be blow molded in a simple manner and in large quantity. In general, the optimum molding temperature is different between the thermoplastic resins and rubbers. If a rubber is heated to a temperature optimum for molding a thermoplastic resin, curing or draw-down of the rubber occurs (in case of natural and synthetic rubbers, draw-down occurs less frequently, but curing occurs while in case of the thermoplastic rubbers, curing does not occur, but draw-down occurs). This problem may be overcome by the present invention.

Next the mode of operation of the third embodiment will be described. When the extruders 14 and 15 force the plasticized plastic and rubber into the reservoirs 43 and 44, the ring pistons 12 and 13 are forced upwardly. The molding plastic and rubber in the reservoirs 43 and 44 are thermally insulated from each other by the air chamber 39 in the partition cylinder 42. In addition, the temperatures of the outer and inner walls of the partition cylinder 42 may be controlled by the heater 6 and cooling holes 7 so that both the molding plastic and rubber may be maintained at the optimum molding temperatures independently of each other. The hydraulic cylinders 16 and 17 are driven to force the ring pistons 12 and 13 downward so that the molding plastic and rubber are forced out of the reservoirs 43 and 44, joined or laminated together at the joining or laminating point and extruded through the clearance between the mandrel 9 and the nozzle 46. As with the case of the first embodiment, the ratio between the thickness of the plastic and rubber layers may be suitably varied by controlling the extrusion speeds. In addition, the overwall section thickness of the wall of the parison being extruded may be also suitably varied by increasing or decreasing the clearance between the nozzle 46 and the mandrel 9 by driving the hydraulic servocylinders 47 and 45.

The third embodiment is arranged so as to extrude the two-layer parison, but it will be obvious to those skilled in the art that it may be so modified as to extrude the three-layer parison or two-layer parison with the outer layer consisting of a rubber.

The parison thus obtained may be blow molded so that the mass production of rubber molded articles becomes feasible.

Figure 9:
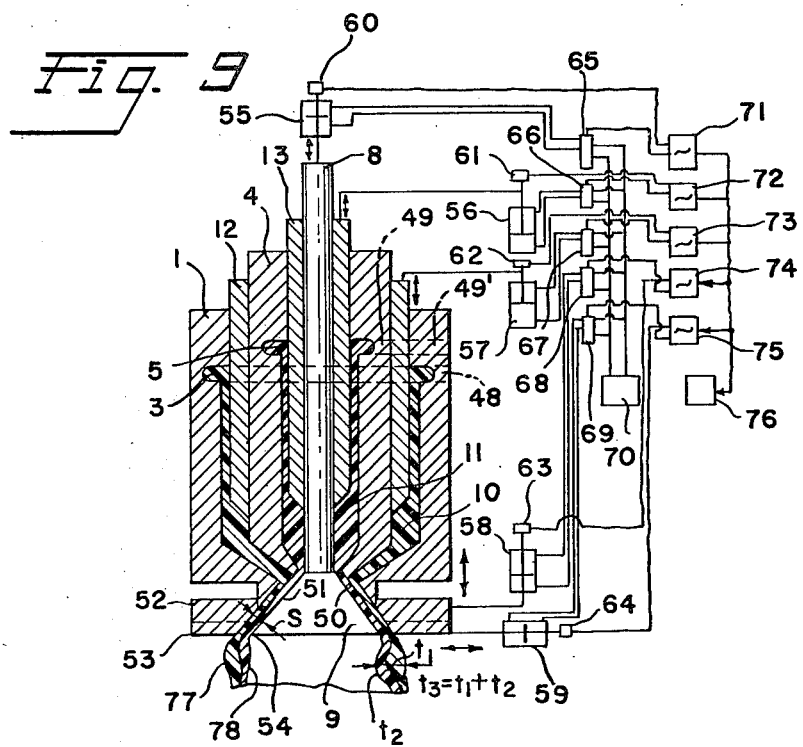
FIG. 9 is a sectional view of a fourth embodiment of a blow molding machine in accordance with the present invention especially adapted to control the wall section thickness of a parison.

In the fourth embodiment shown in FIG. 9, the partition cylinder 4 having the annular molding plastic passage 5 having a molding plastic charging port 49 is coaxially disposed in the molding head 1 with the annular molding plastic passage 3 having a molding plastic charging hole 48. The supporting rod 8 of the mandrel 9 is slidably inserted into the partition cylinder 4 coaxially thereof. The ring piston 12 is slidably interposed between the molding head 1 and the partition cylinder 4, and the molding plastic reservoir 10 is defined between the molding head 1 and the partition cylinder 4 below the annular passage 3. The ring piston 13 is slidably interposed between the cylinder 4 and the supporting rod 8, and the molding plastic reservoir 11 is defined between the partition cylinder 4 and the supporting rod 8 below the annular passage 5. The lower ends of these reservoirs 10 and 11 are opened toward the mandrel 9, and the molding plastics forced out of them are joined at 50. A passage 51 is defined between the molding head 1 and the mandrel 9 at the downstream of the joining point 50. A vertically movable nozzle 52 is placed immediately below the molding head 1, and a horizontally movable nozzle 53 is attached to the lower surface of the vertically movable nozzle 52 so that a passage or extrusion clearance may be defined between the nozzles 52 and 53 on the one hand and the mandrel 9 on the other hand.

The supporting rod 8 is operatively coupled to a hydraulic cylinder 55 which in turn is communicated with a hydraulic power source 70 through a tube. A servo-valve 65 inserted in this tubing and a position sensor 60 attached to the hydraulic cylinder 55 are operatively connected to a programmed valve control unit 71. In like manner, a hydraulic cylinder 56 for the ring piston 13, a hydraulic cylinder 57 for the ring piston 12, a hydraulic cylinder 58 for a vertically movable nozzle 52 and a hydraulic cylinder 59 for the vertically movable nozzle 53 are communicated with the hydraulic power source 70 through tubings, and servo-valves 66, 67, 68 and 69 inserted into these lines and position sensors 61, 62, 63 and 64 attached to the hydraulic cylinders 56, 57, 58 and 59, respectively, are operatively coupled to programmed valve control units 72, 73, 74 and 75, respectively. The five valve control units 71, 72, 73, 74 and 75 are connected to a central control unit 76.

When the molding plastics are charged through the charging holes 49 and 48 into the reservoirs 11 and 10, the ring pistons 13 and 12 are forced upward. Alternatively, when the molding plastics are charged into the reservoirs 10 and 11, the hydraulic cylinders 56 and 57 are actuated to lift the ring pistons 12 and 13. Thereafter the molding plastics are forced out of the reservoirs 10 and 11 by the ring pistons 12 and 13 to flow past the joining point 50 through the extrusion passage 54. The ratio between the thickness $t_1$ of the outer plastic layer 77 and the thickness $t_2$ of the inner plastic layer 78 is in proportion to the flow rate ratio between the plastics flowing toward the joining point 50 from the reservoirs 10 and 11. At the downstream of the joining point 50, the outer and inner molding plastic layers flow at the same rate. Therefore the thickness ratio is in proportion to the flow rate ratio which in turn is in proportion to the speed ratio between the ring pistons 12 and 13. The overall section thickness of the parison extruded out of the molding head 1 is independent of the section width of the extrusion passage 51, but is substantially determined by the section width S of the extrusion outlet 54 which may be adjusted by moving the mandrel 9 or nozzle 52 toward or away from the nozzle 52 or mandrel 9. The eccentric adjustment of the thickness $t_3$ of the parison is also possible by the horizontal displacement of the nozzle 53, which is not used for the control of the overall wall thickness $t_3$ of the parison. The nozzle 53 is moved in unison with the nozzle 52 when the latter is vertically displaced for the control of the overall wall thickness $t_3$ of the parison.

Next the control of the thickness ratio between $t_1$ and $t_2$ of the outer and inner layers of the parison and the overall wall thickness $t_3$ of the parison by the control of the extrusion speeds of the ring pistons 12 and 13 and by the control of the section width S of the extrusion outlet 54 between the mandrel 9 and the nozzles 52 and 53 will be described in detail.

The extrusion speeds of the ring pistons 12 and 13 are controlled by the servo valves 66 and 65, respectively, which in turn are controlled by the control units 73 and 72 in accordance with the programs and in response to the feedback signals from the position sensors 62 and 61. The programs of the control units 72 and 73 may be changed by the pin boards or digital switches. In like manner, in response to the feedback signals from the position sensors 60, 63 and 64 and based upon the programs, the valve control units 71, 74 and 75 control their respective servovalves 65, 68 and 69 which in turn control the supporting rod 8 and hence the mandrel 9, the vertically movable nozzle 52 and the horizontally movable nozzle 53 through the hydraulic cylinders 55, 58 and 59, respectively, so that the section width S and hence the overwall thickness $t_3$ may be controlled. The programs of the control units 71, 74 and 75 may be changed by the pin boards or digital switches.

Thus, according to the fourth embodiment of the present invention, the thickness ratio between the outer and inner layers of the parison and the overall wall section thickness thereof may be simultaneously controlled. It will be obvious to those skilled in the art that the sixth embodiment in accordance with the present invention described above may be so modified as to extrude a multi-layer parison with each layer thickness as well as the overwall section thickness of the parison being automatically controlled.

The above embodiments of the present invention should be considered as illustrative and not as limiting the scope thereof, and it will be understood that various modifications may be effected. For instance, instead of the hydraulic cylinders, any suitable driving devices may be employed to drive the ring pistons and nozzles. The present invention may be also applied to the molding machines for molding a multi-layer parison with more than four layers. Furthermore, if the molding plastics in the adjacent layers have poor affinity, there may be interposed an intermediate layer therebetween which has the satisfactory affinity to both the adjacent layers.

The advantages and features of the present invention may be summarized as follows:

(i) A multi-layer parison wherein each layer may compensate the poor or undesirable physical and chemical properties of other layers may be extruded by the ring pistons. Therefore unlike the conventional cross head type multi-layered parison blow molding machines, the variation in wall thickness and bendings of the parison may be prevented, and each layer may have a uniform thickness.

(ii) The wall thickness ratio between or among the layers of the parison may be arbitarily varied by controlling the extrusion speeds of the individual ring pistons and the extrusion timing. Therefore various combinations of one layer consisting of one molding plastic with other layers different in physical and chemical properties and color may be obtained depending upon the requirements of the final molded articles. Furthermore, by controlling the extrusion timing, any desired plastic layers may be formed over a desired length of the parison so that the considerable economy of the molding materials may be attained.

(iii) The molding compounds or plastics or colors of the outermost and innermost layers may be arbitarily varied so that the properties of the final molded articles may be considerably improved and that the color thereof may be changed stepwise or shaded.

(iv) Because the color of the multi-layer parison may be changed or shaded, colorful molded articles such as decorative articles, equipment used for illumination, containers for toilet products and so on may be easily produced. Since the colors of these molded articles may be charged or shaded as needs demand, they may have higher commercial values.

(v) Since the burr consists of only one kind of molding plastic or compound, the recycle of burr may be much facilitated.

(vi) Since the molding plastics are stored in the reservoirs in the form of a hollow cylinder and extruded by the ring pistons, the weld marks and other surface defects of the parisons produced by the prior art cross head type molding machines may be completely eliminated.

(vii) The extrusion pressures imparted by the ring pistons to the molding plastics in the reservoirs may be suitably varied to change the extrusion speeds of the layers of the parison. Therefore each layer may have a uniform thickness, and the section thickness of each layer may be arbitarily varied in a simple manner.

(viii) Since a plurality of molding plastic layers are joined at one point, the flow rates of the layers at the downstream of the joining point become equal. As a result, the section thickness ratio among the layers is in proportion to the ratio among the flow rates of the molding plastic layers flowing toward the joining point. Therefore, the flow rates of the molding plastic layers flowing from the reservoirs toward the joining point may be controlled by the program control utilizing the servo-valves or proportional solenoid-operated valves so that the section thickness ratio may be suitably varied during the extrusion according to the extrusion program.

(ix) The section width of the extrusion outlet between the mandrel and the nozzle or nozzles may be varied so that the overall section thickness of the wall of the extruded parison may be varied in proportion to the section width. Therefore the overwall section thickness may be suitably varied by controlling the section width according to the extrusion program.

(x) When the program controls described in (xiii) and (ix) are combined, the simultaneous programmed control on both the section thickness of each layer and the overall section thickness of the wall of the parison may be attained.

We claim:

1. A blow molding machine having a parison extrusion head provided with an opening at its lower end and having at least one partition cylinder disposed therein and coaxially thereof and defining a pair of concentrically arranged molding plastic reservoirs, an extruder for each of said resevoirs for charging molding plastics into said reservoirs, a mandrel positioned in the extrusion head opening to define an annular passage between the mandrel and the extrusion head, said mandrel having an upwardly extending rod, a first ring piston surrounding said rod for extruding molding plastic from one of said reservoirs toward said annular passage, a second ring piston surrounding said partition cylinder for extruding molding plastic from the other of said reservoirs toward said annular passage, and separate actuating means for moving said ring pistons to extrude the molding plastics from said reservoirs through said annular passage whereby the layers of molding plastics extruded from the reservoirs may be joined and extruded into a multi-layer parison.

2. A machine according to claim 1 wherein said partition cylinder in the extrusion head adapted for annularly and laminately reserving molding plastics extruded from said extruders includes an air chamber concentrically therein to form a double wall construction so that the cylinder itself may function to allow temperature difference between the outward and inward surfaces thereof, and wherein provided on the outward and inward surfaces of the cylinder are heaters and cooling holes for controlling the temperatures of molding plastics reserved inwardly and outwardly of said cylinder, thereby controlling the temperatures of said inwardly and outwardly reserved plastics independently of each other.

* * * * *